(12) United States Patent
Lofgren et al.

(10) Patent No.: US 7,111,168 B2
(45) Date of Patent: Sep. 19, 2006

(54) DIGITAL WATERMARKING SYSTEMS

(75) Inventors: Neil Lofgren, White Salmon, WA (US); Phillip Andrew Seder, Portland, OR (US); Brian T. MacIntosh, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 1215 days.

(21) Appl. No.: 09/790,322

(22) Filed: Feb. 21, 2001

(65) Prior Publication Data

US 2001/0037313 A1 Nov. 1, 2001

Related U.S. Application Data

(63) Continuation-in-part of application No. 09/562,049, filed on May 1, 2000.

(60) Provisional application No. 60/257,822, filed on Dec. 21, 2000.

(51) Int. Cl.
*H04L 9/00* (2006.01)
(52) U.S. Cl. ........................ 713/176; 380/34
(58) Field of Classification Search ................ 713/176; 380/34; 382/100
See application file for complete search history.

(56) References Cited

U.S. PATENT DOCUMENTS

| | | | |
|---|---|---|---|
| 3,805,238 A | 4/1974 | Rothfjell | |
| 3,845,391 A | 10/1974 | Crosby | |
| 3,891,829 A | 6/1975 | Dobras | |
| 3,894,756 A | 7/1975 | Ward | |
| 3,984,624 A | 10/1976 | Waggener | |
| 4,131,367 A | 12/1978 | French et al. | |
| 4,238,849 A | 12/1980 | Gassmann | |
| 4,313,197 A | 1/1982 | Maxemchuk | |
| 4,325,083 A | 4/1982 | Rouchon et al. | |
| 4,345,011 A | 8/1982 | Drexhage | |
| 4,367,488 A | 1/1983 | Leventer et al. | |
| 4,379,947 A | 4/1983 | Warner | |
| 4,380,027 A | 4/1983 | Leventer et al. | |
| 4,395,600 A | 7/1983 | Lundy et al. | |
| 4,414,635 A | 11/1983 | Gast et al. | |
| 4,425,642 A | 1/1984 | Moses et al. | |
| 4,528,588 A | 7/1985 | Löfberg | |
| 4,547,074 A | 10/1985 | Hinoda et al. | |
| 4,547,804 A | 10/1985 | Greenberg | |

(Continued)

FOREIGN PATENT DOCUMENTS

EP 493091 7/1992

(Continued)

OTHER PUBLICATIONS

U.S. Appl. No. 09/343,104, filed Jun. 1999, Rodriguez et al.

(Continued)

*Primary Examiner*—Salvatore Cangialosi
(74) *Attorney, Agent, or Firm*—Digimarc Corporation

(57) ABSTRACT

A variety of systems responsive to watermarked documents are detailed. In one, watermarking is employed to facilitate secure online transactions. In another, a system for exchanging data is provided. One system includes a user terminal and a central site. The user terminal includes a watermark reader, and a capture device to capture an image of a watermarked document. The central site includes a database of image hashes. The user terminal communicates with the central site. The watermark reader reads a watermark and computes a hash of a captured image, and passes the hash to the central site for comparison with the database of image hashes.

9 Claims, 5 Drawing Sheets

U.S. PATENT DOCUMENTS

| | | |
|---|---|---|
| 4,597,495 A | 7/1986 | Knosby |
| 4,672,605 A | 6/1987 | Hustig et al. |
| 4,675,746 A | 6/1987 | Tetrick et al. |
| 4,679,068 A | 7/1987 | Lillquist et al. |
| 4,750,173 A | 6/1988 | Blüthgen |
| 4,751,571 A | 6/1988 | Lillquist |
| 4,807,031 A | 2/1989 | Broughton et al. |
| 4,855,725 A | 8/1989 | Fernandez |
| 4,855,827 A | 8/1989 | Best |
| 4,888,798 A | 12/1989 | Earnest |
| 4,908,836 A | 3/1990 | Rushforth et al. |
| 4,908,873 A | 3/1990 | Philibert et al. |
| 4,917,500 A | 4/1990 | Lugos |
| 4,947,028 A | 8/1990 | Gorog |
| 4,965,449 A | 10/1990 | Suzuki et al. |
| 4,969,041 A | 11/1990 | O'Grady et al. |
| 4,977,594 A | 12/1990 | Shear |
| 4,990,092 A | 2/1991 | Cummings |
| 4,998,010 A | 3/1991 | Chandler et al. |
| 5,023,907 A | 6/1991 | Johnson |
| 5,047,614 A | 9/1991 | Bianco |
| 5,053,956 A | 10/1991 | Donald et al. |
| 5,059,126 A | 10/1991 | Kimball |
| 5,103,459 A | 4/1992 | Gilhousen et al. |
| 5,113,518 A | 5/1992 | Durst et al. |
| 5,138,712 A | 8/1992 | Corbin |
| 5,146,457 A | 9/1992 | Veldhuis et al. |
| 5,200,822 A | 4/1993 | Bronfin et al. |
| 5,202,828 A | 4/1993 | Vertelney et al. |
| 5,229,841 A | 7/1993 | Taranowski et al. |
| 5,243,423 A | 9/1993 | DeJean et al. |
| 5,262,860 A | 11/1993 | Fitzpatrick |
| 5,284,364 A | 2/1994 | Jain |
| 5,288,976 A | 2/1994 | Citron |
| 5,298,731 A | 3/1994 | Ett |
| 5,303,388 A | 4/1994 | Kreitman et al. |
| 5,319,735 A | 6/1994 | Preuss et al. |
| 5,337,358 A | 8/1994 | Axelrod et al. |
| 5,339,095 A | 8/1994 | Redford |
| 5,341,293 A | 8/1994 | Vertelney et al. |
| 5,385,371 A | 1/1995 | Izawa |
| 5,413,486 A | 5/1995 | Burrows et al. |
| 5,428,731 A | 6/1995 | Powers |
| 5,437,552 A | 8/1995 | Baer et al. |
| 5,446,273 A | 8/1995 | Leslie |
| 5,452,414 A | 9/1995 | Rosendahl et al. |
| 5,459,489 A | 10/1995 | Redford |
| 5,461,711 A | 10/1995 | Wang et al. |
| 5,463,209 A | 10/1995 | Figh |
| 5,466,158 A | 11/1995 | Smith, III |
| 5,484,292 A | 1/1996 | McTaggart |
| 5,493,677 A | 2/1996 | Bfalogh et al. |
| 5,495,411 A | 2/1996 | Ananda |
| 5,495,581 A | 2/1996 | Tsai |
| 5,496,071 A | 3/1996 | Walsh |
| 5,524,933 A | 6/1996 | Kunt et al. |
| 5,525,798 A | 6/1996 | Berson et al. |
| 5,530,852 A | 6/1996 | Meske |
| 5,537,336 A | 7/1996 | Joyce |
| 5,545,883 A | 8/1996 | Sasou et al. |
| 5,548,645 A | 8/1996 | Ananda |
| 5,553,143 A | 9/1996 | Ross et al. |
| 5,569,549 A | 10/1996 | Redford |
| 5,579,479 A | 11/1996 | Plum |
| 5,586,216 A | 12/1996 | Degen et al. |
| 5,587,784 A | 12/1996 | Pines et al. |
| 5,597,307 A | 1/1997 | Redford et al. |
| 5,604,516 A | 2/1997 | Herrod et al. |
| 5,613,004 A | 3/1997 | Cooperman et al. |
| 5,624,265 A | 4/1997 | Redford et al. |
| 5,629,980 A | 5/1997 | Stefik et al. |
| 5,634,012 A | 5/1997 | Stefik |
| 5,636,276 A | 6/1997 | Brugger |
| 5,638,443 A | 6/1997 | Stefik et al. |
| 5,640,193 A | 6/1997 | Wellner |
| 5,646,997 A | 7/1997 | Barton |
| 5,646,999 A | 7/1997 | Saito |
| 5,650,608 A | 7/1997 | Redford et al. |
| 5,652,626 A | 7/1997 | Kawakami et al. |
| 5,652,714 A | 7/1997 | Peterson et al. |
| 5,657,462 A | 8/1997 | Brouwer et al. |
| 5,659,164 A | 8/1997 | Schmid |
| 5,663,766 A | 9/1997 | Sizer, II |
| 5,671,277 A | 9/1997 | Ikenoue et al. |
| 5,693,693 A | 12/1997 | Auslander et al. |
| 5,715,403 A | 2/1998 | Stefik |
| 5,721,788 A | 2/1998 | Powell |
| 5,729,251 A | 3/1998 | Nakashima |
| 5,734,119 A | 3/1998 | France |
| 5,739,814 A | 4/1998 | Ohara et al. |
| 5,745,569 A | 4/1998 | Moskowitz et al. |
| 5,745,604 A | 4/1998 | Rhoads |
| 5,748,763 A | 5/1998 | Rhoads |
| 5,765,152 A | 6/1998 | Erickson |
| 5,765,176 A | 6/1998 | Bloomberg |
| 5,768,426 A | 6/1998 | Rhoads |
| 5,774,452 A | 6/1998 | Wolosewicz |
| 5,778,102 A | 7/1998 | Sandford, II et al. |
| 5,799,092 A | 8/1998 | Kristol et al. |
| 5,801,687 A | 9/1998 | Peterson |
| 5,809,317 A | 9/1998 | Kogan |
| 5,818,441 A | 10/1998 | Throckmorton |
| 5,822,436 A | 10/1998 | Rhoads |
| 5,828,325 A | 10/1998 | Wolosewicz et al. |
| 5,841,886 A | 11/1998 | Rhoads |
| 5,845,281 A | 12/1998 | Benson |
| 5,848,155 A * | 12/1998 | Cox ............................ 380/34 |
| 5,848,413 A | 12/1998 | Wolff |
| 5,848,424 A | 12/1998 | Scheinkman et al. |
| 5,852,673 A | 12/1998 | Young |
| 5,857,038 A | 1/1999 | Owada et al. |
| 5,862,260 A | 1/1999 | Rhoads |
| 5,862,321 A | 1/1999 | Lamming et al. |
| 5,869,819 A | 2/1999 | Knowles et al. |
| 5,872,589 A | 2/1999 | Morales |
| 5,886,337 A | 3/1999 | Rockstein et al. |
| 5,892,900 A | 4/1999 | Ginter et al. |
| 5,893,910 A | 4/1999 | Martineau et al. |
| 5,905,248 A | 5/1999 | Russell et al. |
| 5,905,800 A | 5/1999 | Moskowitz et al. |
| 5,907,149 A | 5/1999 | Marckini |
| 5,918,223 A | 6/1999 | Blum et al. |
| 5,920,861 A | 7/1999 | Hall et al. |
| 5,920,878 A | 7/1999 | DeMont |
| 5,926,822 A | 7/1999 | Garman |
| 5,932,863 A | 8/1999 | Rathus et al. |
| 5,933,798 A | 8/1999 | Linnartz |
| 5,974,141 A | 10/1999 | Saito |
| 5,983,218 A | 11/1999 | Suyeda-Mahmood |
| 5,991,876 A | 11/1999 | Johnson et al. |
| 6,031,914 A | 2/2000 | Tewfik et al. |
| 6,061,451 A | 5/2000 | Muratani et al. |
| 6,064,764 A | 5/2000 | Bhaskaran et al. |
| 6,081,827 A | 6/2000 | Reber et al. |
| 6,122,403 A | 9/2000 | Rhoads |
| 6,199,076 B1 | 3/2001 | Logan et al. |
| 6,209,092 B1 | 3/2001 | Linnartz |
| 6,216,228 B1 | 4/2001 | Chapman et al. |
| 6,226,387 B1 * | 5/2001 | Tewfik et al. ............... 382/100 |
| 6,236,971 B1 | 5/2001 | Stefik et al. |
| 6,243,480 B1 | 6/2001 | Zhao et al. |
| 6,256,638 B1 | 7/2001 | Dougherty |
| 6,292,092 B1 | 9/2001 | Chow et al. |
| 6,301,360 B1 | 10/2001 | Bocionek |

| | | | |
|---|---|---|---|
| 6,310,956 | B1 | 10/2001 | Morito et al. |
| 6,311,214 | B1 | 10/2001 | Rhoads |
| 6,321,981 | B1 | 11/2001 | Ray et al. |
| 6,345,104 | B1 | 2/2002 | Rhoads |
| 6,400,272 | B1 | 6/2002 | Holtzman et al. |
| 6,425,081 | B1 | 7/2002 | Iwamura |
| 6,434,561 | B1 | 8/2002 | Durst, Jr. et al. |
| 6,449,377 | B1 | 9/2002 | Rhoads |
| 6,493,457 | B1 * | 12/2002 | Quackenbush et al. ..... 713/176 |
| 6,504,941 | B1 | 1/2003 | Wong |
| 6,526,449 | B1 | 2/2003 | Philyaw et al. |
| 6,557,103 | B1 * | 4/2003 | Boncelet et al. ............ 713/176 |
| 6,577,336 | B1 | 6/2003 | Safai |
| 6,631,404 | B1 | 10/2003 | Philyaw |
| 6,664,976 | B1 | 12/2003 | Lofgren et al. |
| 6,834,308 | B1 | 12/2004 | Ikezoye et al. |
| 6,871,789 | B1 | 3/2005 | Hilton et al. |
| 2001/0001854 | A1 | 5/2001 | Schena et al. |
| 2001/0026377 | A1 | 10/2001 | Ikegami |
| 2001/0026618 | A1 | 10/2001 | Van Wie et al. |
| 2001/0026629 | A1 | 10/2001 | Oki |
| 2001/0029580 | A1 | 10/2001 | Moskowitz |
| 2001/0032186 | A1 | 10/2001 | Iwamura |
| 2001/0032312 | A1 | 10/2001 | Runje et al. |
| 2001/0037210 | A1 | 11/2001 | Hirayama |
| 2001/0037378 | A1 | 11/2001 | Hirayama |
| 2001/0047426 | A1 | 11/2001 | Hunter |
| 2001/0047428 | A1 | 11/2001 | Hunter |
| 2001/0054149 | A1 | 12/2001 | Kawaguchi et al. |
| 2001/0056468 | A1 | 12/2001 | Okayasu et al. |
| 2001/0056573 | A1 | 12/2001 | Kovac et al. |
| 2002/0010684 | A1 | 1/2002 | Moskowitz |
| 2002/0019946 | A1 | 2/2002 | Iwamura |
| 2002/0023058 | A1 | 2/2002 | Taniguchi et al. |
| 2002/0026867 | A1 | 3/2002 | Hasegawa et al. |
| 2002/0029257 | A1 | 3/2002 | Watanabe et al. |
| 2002/0034032 | A1 | 3/2002 | Sugiyama et al. |
| 2002/0042808 | A1 | 4/2002 | Smith et al. |
| 2002/0042884 | A1 | 4/2002 | Wu et al. |
| 2002/0046171 | A1 | 4/2002 | Hoshino |
| 2002/0048621 | A1 | 4/2002 | Boyd et al. |
| 2002/0049908 | A1 | 4/2002 | Shimosato et al. |
| 2002/0056041 | A1 | 5/2002 | Moskowitz |
| 2002/0059238 | A1 | 5/2002 | Saito |
| 2002/0059580 | A1 | 5/2002 | Kalker et al. |
| 2002/0061120 | A1 | 5/2002 | Carr et al. |
| 2002/0071556 | A1 | 6/2002 | Moskowitz et al. |
| 2002/0080396 | A1 | 6/2002 | Silverbrook et al. |
| 2002/0111857 | A1 | 8/2002 | Harris et al. |
| 2002/0126872 | A1 | 9/2002 | Brunk et al. |
| 2002/0172425 | A1 | 11/2002 | Venkatesan et al. |
| 2002/0178410 | A1 | 11/2002 | Haitsma et al. |
| 2003/0065922 | A1 | 4/2003 | Fredlund et al. |
| 2003/0097568 | A1 | 5/2003 | Choi et al. |
| 2003/0101162 | A1 | 5/2003 | Thompson et al. |
| 2004/0254890 | A1 | 12/2004 | Sancho et al. |
| 2005/0071377 | A1 | 3/2005 | Mihcak et al. |

FOREIGN PATENT DOCUMENTS

| | | |
|---|---|---|
| EP | 650146 | 10/1994 |
| EP | 953938 | 11/1999 |
| EP | 1117246 | 7/2001 |
| EP | 1134710 | 9/2001 |
| EP | 1137244 | 9/2001 |
| EP | 1139244 | 10/2001 |
| EP | 1173001 | 1/2002 |
| EP | 1199878 | 4/2002 |
| JP | 07-108786 | 4/1995 |
| JP | 07-093567 | 9/1995 |
| WO | 92/16913 | 10/1992 |
| WO | 94/27228 | 11/1994 |
| WO | 95/14289 | 5/1995 |
| WO | 95/20291 | 7/1995 |
| WO | 96/01464 | 1/1996 |
| WO | 96/03736 | 2/1996 |
| WO | WO 96/03286 | 2/1996 |
| WO | 96/19795 | 6/1996 |
| WO | 96/19821 | 6/1996 |
| WO | 96/27259 | 9/1996 |
| WO | 96/29749 | 9/1996 |
| WO | 96/36163 | 11/1996 |
| WO | 97/01137 | 1/1997 |
| WO | 97/02552 | 1/1997 |
| WO | 97/06502 | 2/1997 |
| WO | 97/32262 | 9/1997 |
| WO | 01/43080 | 6/2001 |
| WO | WO 01/43080 | 6/2001 |
| WO | WO 01/75629 | 10/2001 |
| WO | WO 01/97128 | 12/2001 |
| WO | WO 02/03385 | 1/2002 |
| WO | WO 02/07425 | 1/2002 |
| WO | WO 02/07442 | 1/2002 |
| WO | WO 02/13073 | 2/2002 |
| WO | WO 02/19589 | 3/2002 |
| WO | WO 02/23489 | 3/2002 |
| WO | WO 02/27617 | 4/2002 |
| WO | WO 02/27720 | 4/2002 |
| WO | 02/37331 | 5/2002 |
| WO | WO 09/39713 | 5/2002 |

OTHER PUBLICATIONS

U.S. Appl. No. 09/503,881, filed Feb. 2000, Rhoads et al.
U.S. Appl. No. 09/547,664, filed Apr. 2000, Rhoads et al.
U.S. Appl. No. 09/562,516, filed May 2000, Rodriguez et al.
U.S. Appl. No. 09/562,524, filed May 2000, Carr et al.
U.S. Appl. No. 09/571,422, filed May 2000, Rhoads et al.
U.S. Appl. No. 09/636,102, filed Aug. 2000, Ramos et al.
U.S. Appl. No. 09/562,049, filed May 2000, Seder.
U.S. Appl. No. 60/257,822, filed Dec. 2000, Aggson et al.
"Copyright Protection for Digital Images, Digital Fingerprinting from FBI," Highwater FBI brochure, 1995, 4 pages.
"Access Control and COpyright Protection for Images, WorkPackage 8: Watermarking," Jun. 30, 1995, 46 pages.
Alattar, "Smart Images" Using Digimarc's Watermarking Technology, SPIE 12th Int'l Symposium on Electronic Imaging, Vo. 3971, No. 25, pp. 1-10, Jan. 2000.
Koch et al., "Copyright Protection for Multimedia Data," Proc. of the International Conference on Digital Media and Electronic Publishing, Dec. 6-8, 1994, Leeds, U.K., 15 pages.
PCT/US01/14014, Notification of Transmittal of International Preliminary Examination Report and International Preliminary Examination Report, dated May 14, 2003.
PCT/US01/14014, Notification of Transmittal of the International Search Report or the Declaration and International Search Report, dated Aug. 28, 2001.
Dautzenberg, "Watermarking Images," Department of Microelectronics and Electrical Engineering, Trinity College Dublin, 47 pages, Oct. 1994.
Bruckstein, A.M.; Richardson, T.J., "A holographic transform domain image watermarking method," Circuits, Systems, and Signal Processing vol. 17, No. 3, p. 361-89, 1998. This paper includes an appendix containing an internal memo of Bell Labs, which according to the authors of the paper, was dated Sep. 1994.
"High Water FBI Limited Presentation Image Copyright Protection Software," FBI Ltd brochure, Jul. 1995, 17 pages.
Kurak et al., "A Cautionary Note On Image Downgrading," 1992 IEEE, pp. 153-159.
Mintzer et al., "Safeguarding Digital library Contents and Users" Digital Watermarking, D-Lib Magazine, Dec. 1997: ISSN 1082-9873.

"Multimedia Mixed Object Envelopes Supporting a Graduated Fee Scheme via Encryption," IBM Technical Disclosure Bulletin: vol. 37, No. 03, Mar. 1994, p. 413.

Press Release, Presto Technologies, Inc..Launches PrestoPass Platform at Demo 2000; Feb. 7, 2000.

Presto Developer's Kit, 2 pages, from web.archive.org copy of www.prestotech.com, Mar. 2000.

PrestoPass, One-Wave E-Commerce, 2 pages, from web.archive.org copy of www.prestotech.com, Mar. 2000.

Scanlon, "The Thing Network," Wired Magazine, Feb. 2000.

Szepanski, "A Signal Theoretic Method for Creating Forgery-Proof Documents for Automatic Verification," Proceedings 1979 Carnahan Conference on Crime Countermeasures, May 16, 1979, pp. 101-109.

Szepanski, "Additive Binary Data Transmission for Video Signals," Papers Presented at Conf. Of Comm. Engineering Soc. Sep. 30-Oct. 3, 1980, Technical Reports vol. 74, pp. 342-352.

Tirkel et al, "Electronic Water Mark," DICTA-93, Macquarie University, Sydney, Australia, Dec. 1993, pp. 666-673.

* cited by examiner

DIGITAL WATERMARKING SYSTEMS

RELATED APPLICATION DATA

This application claims the benefit of U.S. Provisional Application No. 60/257,822, filed Dec. 21, 2000. This patent application is also a continuation-in-part of U.S. application Ser. No. 09/562,049, filed May 1, 2000. These applications are hereby incorporated by reference.

The subject matter of the present application is related to that disclosed in U.S. applications Ser. No. 09/127,502, filed Jul. 31, 1998 (now U.S. Pat. No. 6,345,104); Ser. No. 09/074,034, filed May 6, 1998 (now U.S. Pat. No. 6,449,377); Ser. No. 09/343,104, filed Jun. 29, 1999; Ser. No. 09/503,881, filed Feb. 14, 2000 (now U.S. Pat. No. 6,614,914); Ser. No. 09/547,664, filed Apr. 12, 2000; Ser. No. 09/562,516, filed May 1, 2000; Ser. No. 09/562,524, filed on May 1, 2000 now U.S. Pat. No. 6,724,912); Ser. No. 09/571,422, filed May 15, 2000 (now U.S. Pat. No. 6,947,571); 09/636,102, filed Aug. 10, 2000; and in U.S. Pat. No. 5,862,260. Each of these patent documents is hereby incorporated by reference.

FIELD OF THE INVENTION

The present invention relates to hidden data systems, and is particularly illustrated with reference to documents employing digital watermarks.

BACKGROUND AND SUMMARY OF THE INVENTION

Digital watermarking technology, a form of steganography, encompasses a great variety of techniques by which plural bits of digital data are hidden in some other object without leaving human-apparent evidence of alteration. Many such techniques are detailed in the above-cited documents.

In accordance with one embodiment of the present invention, watermarking is employed to facilitate e-commerce transactions. More particularly, watermarking is employed to assure that an on-line purchaser of goods has physical custody of the credit card being charged. Without such custody, the credit card issuer will refuse the requested transaction.

According to another embodiment, a method of commerce over the internet between a user and a merchant is provided. The user is in possession of a document including an embedded watermark. The method includes the steps of: i) extracting identifying data from the watermark, and passing the identifying data to a central site; ii) at the central site, identifying a financial institution identifier associated with the document and passing the identifier and a session ticket to the user; iii) contacting the financial institution via the financial institution identifier and passing the session ticket to obtain an authentication ticket; iv) passing the authentication ticket from the user to the merchant to facilitate a transaction; and v) providing the authentication ticket from the merchant to the financial institution.

In still another embodiment, a method of verifying data is provided. The method includes the steps of: i) digitally capturing an image; ii) computing a hash of the captured image; and iii) comparing the hash with a database of hashes, the database of hashes comprising hashes corresponding to previously captured images.

A system for exchanging data is provided according to yet another embodiment. The system includes a user terminal and a central site. The user terminal includes a watermark reader, and a capturing device to capture an image. The central site includes a database of image hashes. The user terminal communicates with the central site. Also, the reader reads a watermark and computes a hash of a captured image and passes the hash to the central site for comparison with the database of image hashes.

According to another embodiment, a method is provided for commerce over a communications system between a user and a merchant. The system includes a central computer, a user computer, a merchant computer and a financial institution computer. The user computer includes a watermark reader. The various computers communicate via a network. The method includes the steps of: i) accessing the merchant computer from the user computer; ii) launching on the user computer the watermark reader to read a document comprising an embedded watermark, the watermark reader extracting identifying data from the watermark; iii) accessing the central computer from the user computer to obtain a URL for the financial institution computer and a ticket, the URL being identified from the extracted identifying data; iv) passing the ticket from the user computer to the financial institution computer to obtain an authorization; v) upon receipt of the authorization, passing the authorization from the user computer to the merchant computer; and vi) passing the authorization from the merchant computer to the financial institution computer.

A computer readable medium having a data structure stored thereon is provided according to another embodiment. The data structure includes a document identifier, a document type identifier; a hash of an image from which the document identifier and document type identifier were extracted from.

The foregoing and other features and advantages of the present invention will be more readily apparent from the following detailed description, which proceeds with reference to the accompanying drawings.

DETAILED DESCRIPTION

Figure 1:
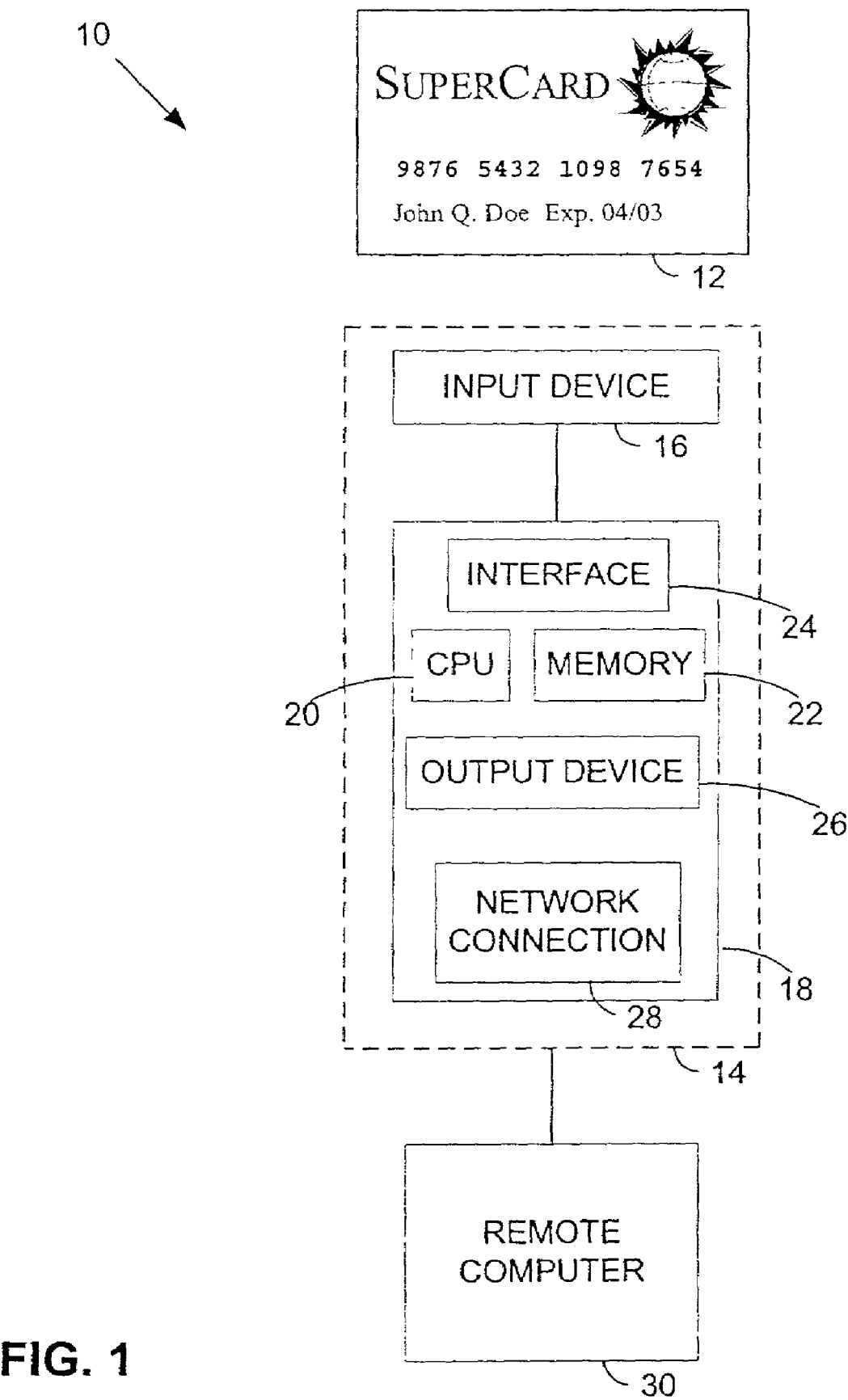
FIG. 1 illustrates a system according to an illustrative embodiment of the present invention.

In accordance with one embodiment 10 of the present invention, a document 12 includes plural-bit digital data steganographically encoded therein (e.g., by digital watermarking). The document can be a photo ID (e.g., a driver's license, student ID, or passport), a value document (e.g., a banknote, stock certificate, or other financial instrument), a credit card, a product manual, bank or credit account card, registration card, or virtually any other type of document.

The encoding of the document can encompass artwork or printing on the document, the document's background, a laminate layer applied to the document, surface texture, etc. If a photograph is present, it too can be encoded. A variety of watermark encoding techniques are detailed in the cited patents and applications; artisans in the field know many more.

For expository convenience, this section focuses on photo ID cards and credit cards, but it will be recognized that the invention is not so limited.

In an illustrative embodiment, the card is encoded with a payload of 32 bits. This payload is processed before encoding, using known techniques (e.g., convolutional coding, turbo codes, etc.), to improve its reliable detection in adverse conditions. In other embodiments, a payload larger or smaller than 32 bits can naturally be used (e.g., 8–256 bits).

The encoded card is presented to a reader station 14 for reading. The reader station 14 includes an input device 16 and a processor 18.

The input device 16 can take various forms, including a flatbed scanner, a hand scanner (including an imaging mouse), a video camera, etc.

The processor 18 can be a general purpose or dedicated computer, incorporating a CPU 20, memory 22, an interface 24 to the input device, a display screen or other output device 26, and optionally a network connection 28. The network connection can be used to connect, through an intranet, internet, or otherwise, to a remote computer 30.

Suitable software programming instructions, stored in memory 22 of processor 18, or in a memory of remote computer 30, can be used to effect various types of functionality for embodiment 10.

One functionality is to increase security for credit card-based e-commerce transactions. Presently, all that is required to purchase goods on-line is a credit card number. Credit card numbers may be obtained illicitly in numerous ways, from dumpster diving to intercepting unencrypted internet transmissions, or by hacking into an online database.

In accordance with this application of the invention, a bank or other entity that issues credit cards may offer a service to its subscribers that requires physical presentment of a credit card before certain purchases (e.g., on-line purchases) can be made. If a subscriber has elected to participate in such a program, the issuer will refuse to authorize payment for any transaction in which the credit card has not been physically presented.

In one such arrangement, a subscriber's home computer, with associated web cam, serves as the reader station 14. On presenting the credit card to the web cam 16, software in the computer decodes a watermark encoded in the credit card artwork, surface texture, etc. Only if this watermark is properly decoded is the card deemed to be present.

The actual verification process can take numerous forms. In one, the credit card number is not passed to the vendor until it is locally verified by reference to the watermark data. In one such arrangement, the card number is provided to the computer in one of various ways (e.g., by typing into a web form presented by internet browser software; by serving from a secure cache, etc.). Before, or after, the computer decodes the watermark data from the physical credit card presented to the web cam. The computer then checks for a predetermined type of correspondence between the credit card number and the watermark data (e.g., the credit card number, processed by a hash function, must yield the watermark payload). Only if the watermark data and credit card number properly correspond is the credit card number transmitted from the browser to the vendor. This approach has, as one of its advantages, that the data exchange protocols between the user, the vendor, and the issuer, needn't be changed.

In another arrangement, both the decoded watermark data and the credit card number are passed to the vendor, and from the vendor to the card issuer. The card issuer can then confirm that the watermark data and credit card number correspond in a predetermined manner, and authorize the transaction if such correspondence is found. This approach has as one of its advantages that the correspondence check is not made at the user's computer, thereby making the verification algorithms employed more secure against hacking.

In still other arrangements, the user does not enter the credit card information at the time of the transaction. Instead, the card number may have already been stored at a remote site on the internet, e.g., at a vendor's database. A cookie stored on the user's computer may be checked by the vendor to determine the identity of the consumer, and thereby identify the corresponding credit card number.

To guard against unauthorized charging in this context, the issuer can refuse charge authorization when the card number is forwarded to it by the vendor. With its refusal, the issuer can provide an error code that indicates, to the vendor, that the user must demonstrate physical custody of the card before the charge will be authorized. The vendor can then query the user computer for this information. If the user has not already done so, the card can be presented to the web cam, and the decoded watermark data then passed to the vendor, and then to the issuer for confirmation of the necessary correspondence.

The back-and-forth just described can be overcome by storing data in the cookie indicating that physical presentment of that user's credit card is required before any credit card transaction can be approved. Such indicia can be added to the cookie the first time a charge authorization is refused for lack of such presentment. Thereafter, when the vendor detects such indicia in the user cookie, it can query the user for watermark data (e.g., inviting the user to present the credit card to the web cam, if necessary) before passing the transaction data to the issuer.

If this (or other) physical presentment technology becomes sufficiently widespread, standards may evolve by which vendors can discern—from data on the user's computer—whether physical presentment is required for credit card transactions. In such case, individual vendor cookies on a user's machines needn't be updated. Instead, a single datum (a cookie or otherwise)—referred to by all vendors—can be used to flag the need for presentment.

(The reference to "other" physical presentment technology anticipates that alternative arrangements may be employed to confirm user custody of a credit card. These may involve magnetic stripe readers, detection of other physical features, communication with a processor-, memory-, or other circuitry-embedded in a card, etc.)

Secure Transaction System

Figure 2:
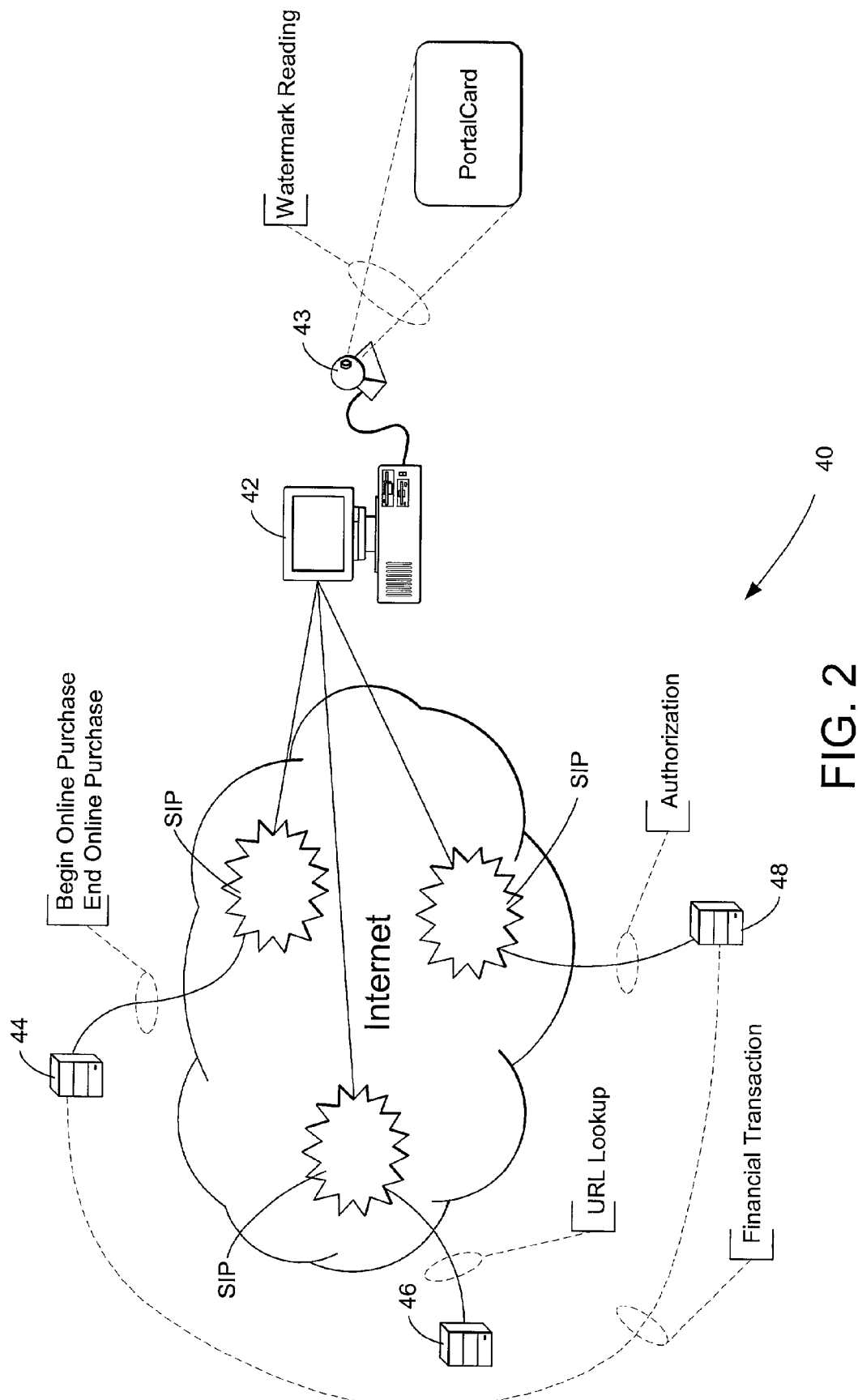
FIG. 2 illustrates a system according to an illustrative embodiment of the present invention.

A secure transaction system is described with reference to FIG. 2. FIG. 2 illustrates system 40, which facilitates a transaction for goods, financial instruments, services, etc. The transaction occurs online (e.g., over the internet). However, the principles described herein are equally applicable to transactions occurring over dedicated networks, wireless networks, intranets, WANs, LANs, etc. The overall system 40 components are described with reference to FIG. 2. Further system operations are described with respect to FIGS. 3a–8.

In the present invention, communication between a client and a host (or a plurality of hosts) is facilitated. The client and host may both reside locally, or may communicate over remote channels. Communication between the client and host may occur via internet protocols (e.g., TCP/IP), or other communication techniques. In one embodiment, the client is maintained on a user terminal (or user computer, server, etc.), while the host resides on a central site. In another embodiment, the client and host are incorporated within a local system. In still another embodiment, the host is dispersed throughout various sites. These and other such variations are within the scope of the present invention.

With reference to FIG. 2, system 40 includes a user terminal 42, merchant site 44, central site 46, financial institution site 48, and (optionally) remote terminal 50. The user terminal 42 may include a general purpose or dedicated computer incorporating at least a CPU, memory, interface to an input device (e.g., web cam, digital video camera, scanner, and/or still digital camera, etc.) 43, a display (or other output device), and a network connection. The network connection may be used to connect through an intranet, the internet, or otherwise communicate with sites 44, 46, and/or 48. Of course, the user terminal 42 may alternatively include a portable computing unit, such as a personal financial assistant, PocketPC, PalmPilot, etc., with associated components and/or wireless, cable, phone or other networking access. Suitable client software programming instructions, stored in the user terminal memory, or in a memory of a remote computer, can be used to effect various types of functionality for the user terminal 42.

Merchant site 44, central site 46, and financial site 48 each include a computer or server (or a plurality of interconnected servers). As will be appreciated by those skilled in the art, these computers maintain and execute software, e.g., for hosting (and/or supporting) web pages, communication, database management, etc. These sites 44, 46, and 48 also maintain suitable software program instructions to facilitate the system operations described herein. Of course, system 40 may include a plurality of merchant and financial sites, and additional and/or alternative central sites.

Figure 3A:
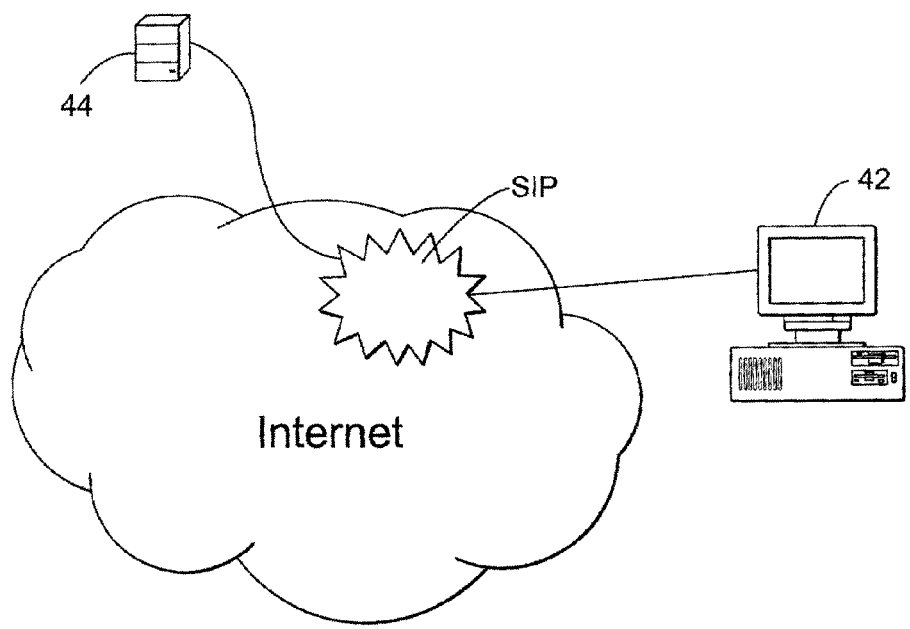
FIGS. 3a through 8 further illustrate the system of FIG. 2.

With reference to FIG. 3a, a user initiates an online purchase by accessing a website or other interface supported by merchant site 44, e.g., with the aid of an interface residing on user terminal 42. The interface may include a dialog box, web browser, application, and/or other communication mechanism. .A secure, session-oriented internet protocol ("SIP") connection is preferably created between the merchant site 44 and the user terminal 42. This type of connection helps to prevent unauthorized eavesdropping by a third party.

Figure 3B:
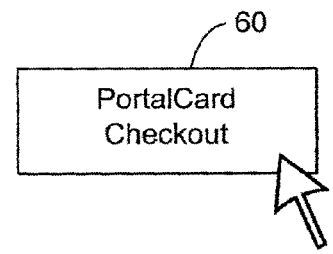

In one embodiment, the user makes a transaction selection via the merchant's website and proceeds to an online checkout location. The checkout location is preferably a graphical user interface (e.g., a dialog box), which allows the user to select at least one secure checkout option 60. Of course, the checkout could be integrated into another application or interface. As shown in FIG. 3b, one secure checkout option 60 is a "PortalCard™" checkout option. A PortalCard™ may be a digitally watermarked credit card, access token, voucher, check, note, other watermarked document, etc. The documents discussed above are broadly defined so as to include a PortalCard™. (For consistency, the term "document" will be used hereafter instead of PortalCard™). Upon selecting the secure checkout option 60, a watermark decoder (e.g., a browser software plug-in) is launched on the user terminal 42. As an alternatively arrangement, instead of launching the decoder upon selecting the secure checkout option 60, the decoder remains active in the operating background. Of course, the decoder may be integrated into other applications, such as an operating system, software application, independent software module, device, system, etc., as discussed in assignee's Ser. No. 09/636,102 application. Such a decoder detects and reads an embedded watermark (or watermarks) from a signal suspected of containing the watermark. The watermark preferably includes additional data, such as a plural-bit message, payload and/or identification bits, which is extracted by the decoder.

Figure 4:
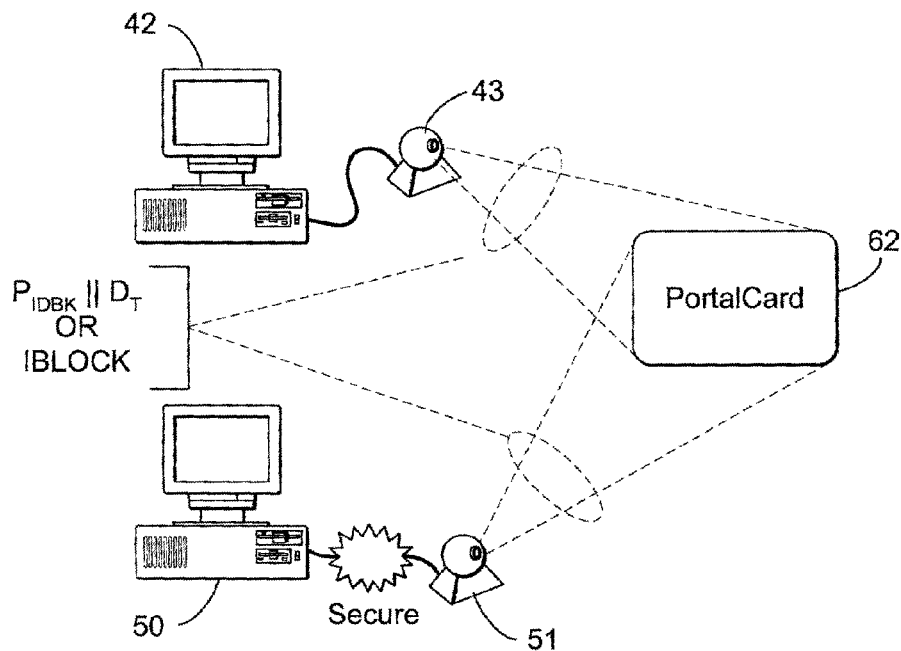

Preferably, the user is prompted to position or to otherwise arrange the document 62 for image capture by input device 43 (FIG. 4). The decoder examines a captured image (or images) and reads the digital watermark to extract the additional data. The additional data may include a document ID ($P_{IDBK}$) and a document type identifier ($D_T$). These identifiers may be concatenated strings or may be segmented within the additional data (or payload). (The symbol ∥ in the drawings represents concatenated data.). Of course, the data could be combined in another manner, such as in segments, packets or blocks. The document ID uniquely identifies the document and may optionally be associated with a user account (e.g., a credit or cash account). The length of the document identifier is preferably selected based on application and/or system requirements. In an illustrative embodiment, the document identifier includes 8–256 bits (e.g., 8, 32, 44, 64, 128, etc. bits). To provide further security, the document ID may be encrypted with a symmetric key ($B_K$) from the document's issuing institution (e.g., a bank). Preferably, only the issuing institution has possession of the symmetric key.

Software executing at user terminal 42 preferably computes a hash of each captured image. This software may be included as part of the watermark decoder, or may be a separate application or module. Each captured image will generally have a unique hash associated with it. Even images of the same document will have unique features respectively associated with them due to environmental changes (e.g., positioning of the document relative to the camera, background changes, orientation, lighting, etc.). Examples of common hashing algorithms include MD2, MD5, MD11, SHA, and SHA1. Of course, these and other hashing algorithms can be effectively used with the present invention. A computed hash is represented by $I_H$ in the figures.

Figure 5:
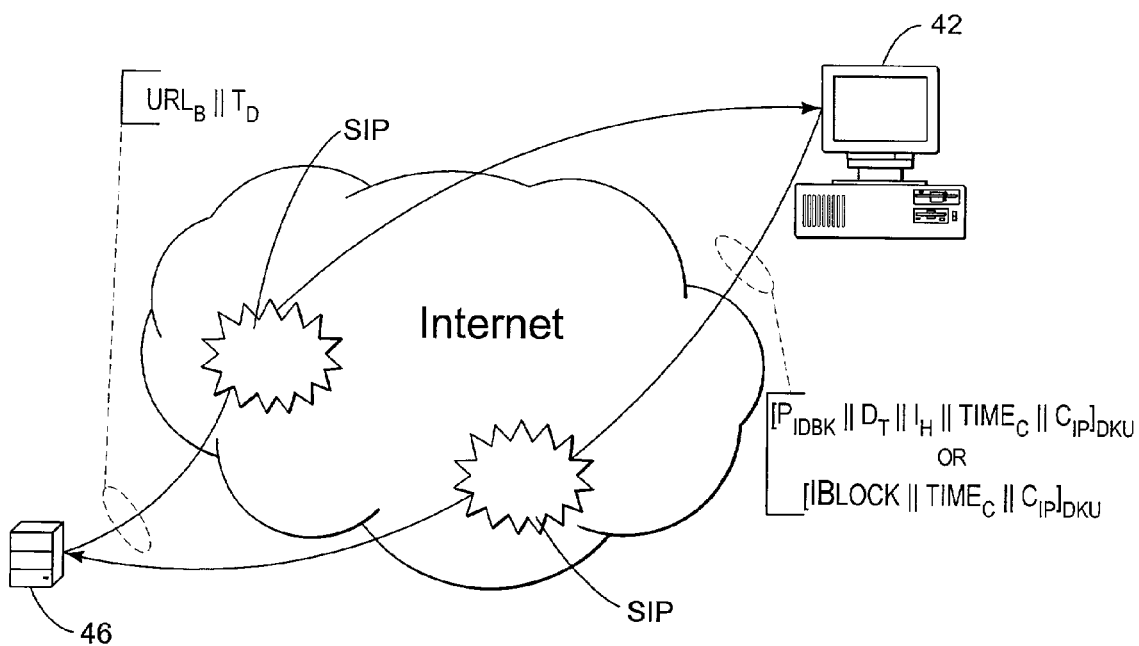

As shown in FIG. 5, the user terminal 42 contacts and establishes a secure communications channel with the central site 46. The user terminal 42 passes a request to the central site 46. The request preferably includes the encrypted document ID ($P_{IDBK}$), document type ($D_T$), unique image hash ($I_H$), the user terminal's IP address ($C_{IP}$), and a timestamp (TIMEc) of the request. Of course, the request could include more or less information depending on need and system implementation. Encrypting the request with a central site public key ($_{DKU}$) provides additional security. In FIG. 5 the encrypted request is represented by:

$$[P_{IDBK}\|D_T\|I_H\|\text{TIME}_C\|C_{IP}]_{DKU}.$$

The central site 46 has a corresponding private key to facilitate decryption of the request.

The user terminal 42 may obtain a timestamp in various ways. For example, a timestamp may be obtained by online synchronization of user terminal 42 with central site 46. The user terminal 42 may alternatively maintain or gain access to (e.g., via the internet) an atomic clock.

The central site 46 decrypts a request using the corresponding private key. The central site 46 then has access to the request's components, including the encrypted document ID, document type, unique image hash, the user terminal's IP address, and timestamp. As discussed above, the document ID is preferably encrypted with the issuing financial institution's symmetric key, thus preventing the central site 46 from decrypting or otherwise accessing the document ID—providing a further level of security for system 40.

If provided in a request, the hash ($I_H$) is used as an additional security measure. The central site 46 compares the hash against all other hashes received and stored from the user terminal 42. For even further security, the hash is compared against all stored hashes, or a subset of the stored hashes. A match indicates that the hash was computed from an identical image. Such a match is a near impossibility for a legitimate request when considering background changes, orientation, position variations, etc. A match may suggest that an attack via capture and playback is being carried out. Accordingly, the request is preferably dropped (e.g., is not processed) if a match is found. As an alternative to dropping the request, the central site 46 could query the user for additional verification (e.g., a PIN, password, or instructions to recapture the image).

The timestamp can also be used as an additional security feature. The central site 46 checks whether the timestamp is within an acceptable time window. Preferably, the central site 46 will not process the request if the timestamp indicates that the request was stamped outside of the window. This technique also helps to prevent capture and playback by an unauthorized third party.

The central site 46 identifies corresponding information by using the document type identifier ($D_T$) as an index or reference. For example, the document type identifier is used to index into a database of URLs. These URLs respectively correspond to various financial institutions, which have issued watermarked documents. The central site 46 matches the document type identifier ($D_T$) with a URL (e.g., $URL_B$) corresponding to the document's issuing institution. In this example, the issuing institution is financial institution 48.

The central site 46 provides a session ticket ($T_D$). The session ticket preferably includes the encrypted document ID ($P_{IDBK}$), a timestamp for the return ticket ($TIME_D$) and an IP address for the user terminal 42. The session ticket is preferably encrypted with the financial institution's public key ($_{BKU}$). Such encryption helps to prevent a malicious or unauthorized user of the user terminal 42 from interpreting and modifying the session ticket ($T_D$). The user's IP address may be verified at a later stage of the transaction process. Such IP address verification helps prevent misdirection of the session receipt. The session ticket and the URL of the financial institution ($URL_B$) are returned to the user terminal 42 (e.g., $URL_B \| T_D$ in FIG. 5).

Figure 6:
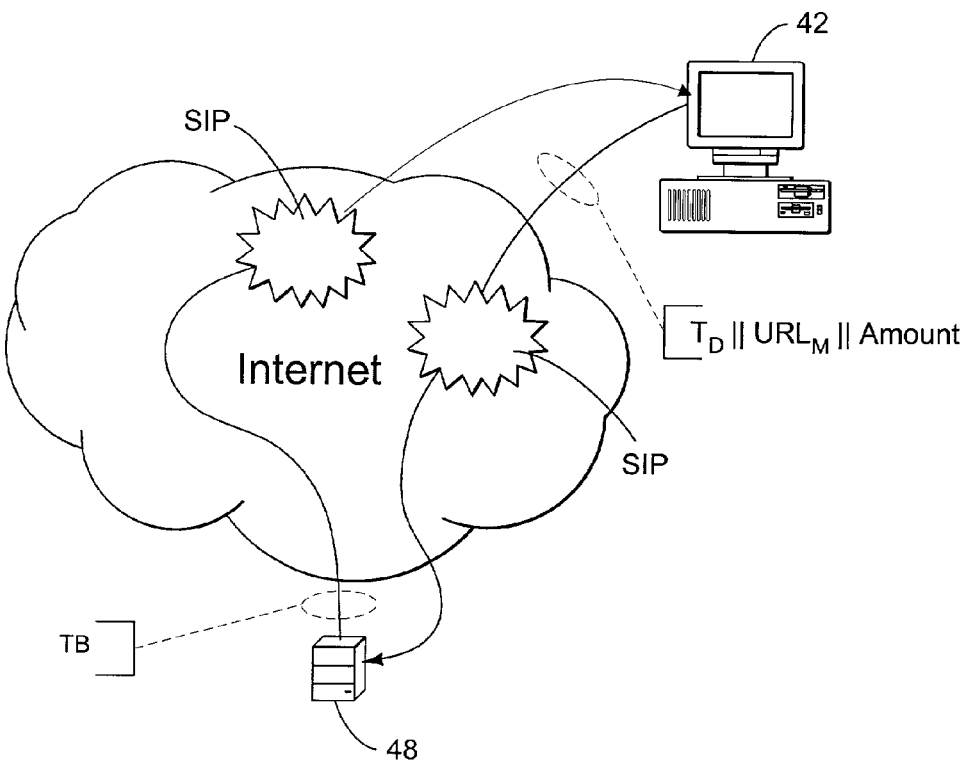

With reference to FIG. 6, upon receipt of the $URL_B$ and session ticket ($T_D$) the user's client (e.g., client software residing at user terminal 42) contacts financial institution 42 via the $URL_B$. The client (via user terminal 42) passes the session ticket ($T_D$), merchant site URL (e.g., $URL_M$), and the transaction details to financial institution 48. The transaction details preferably include the amount of the online purchase. The connection with the financial institution 48 is preferably secure (e.g., through a secure session internet protocol connection).

The financial institution 48 decrypts the session ticket with its corresponding private key. The user terminal IP address and return timestamp may be verified to determine any misdirection or playback attack. The financial institution 48 now has access to the encrypted document ID, which it decrypts with its symmetric key. The decrypted document ID is used to index or otherwise locate the user's account. In some cases, the document ID may include the user's account number. The user's corresponding account may be queried to determine if the user has sufficient funds (or credit) for the transaction amount. The financial institution may optionally prompt the user terminal 42 for a second form of identification (e.g., a PIN or password) before authoring the transaction. In an alternative embodiment, the PIN (or other verification) is collected and included in the session ticket, thus providing further efficiency for the system.

The financial institution 48 provides an authorization ticket ($T_B$) to the user terminal 42 upon authorization of a transaction (FIG. 6). An authorization ticket preferably includes the document ID, a timestamp for the ticket, the user terminal's IP address, the merchant's URL, and the amount of the transaction. The authorizing ticket is used to help facilitate payment to the merchant. The authorization ticket is preferably encrypted using a symmetric key ($B_K$) associated with the financial institution. Since only the financial institution 48 knows the symmetrical key, encrypting the authorization ticket as such prevents a malicious user or merchant from interpreting or modifying the authorization ticket ($I_B$).

Figure 7:
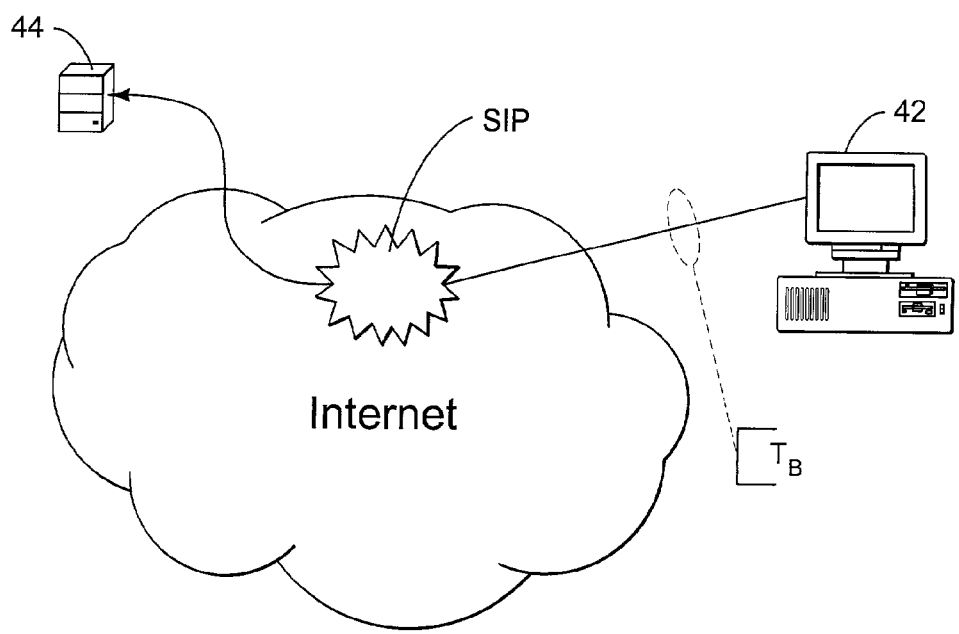

The user's client residing at terminal 42 passes the bank authorization ticket ($T_B$) to the merchant site 44, as shown in FIG. 7. The client may also pass additional information such as shipping and handling information. This information is optionally stored locally at the user terminal 42, and submitted automatically to the merchant site 44 with the authorization ticket. The user may also be presented with a dialog screen, which allows entry and/or changes to shipping and handling requirements. Since the bank authorization ticket is encrypted with a symmetrical key, the authorization ticket cannot be meaningfully decrypted or altered by the user.

Figure 8:
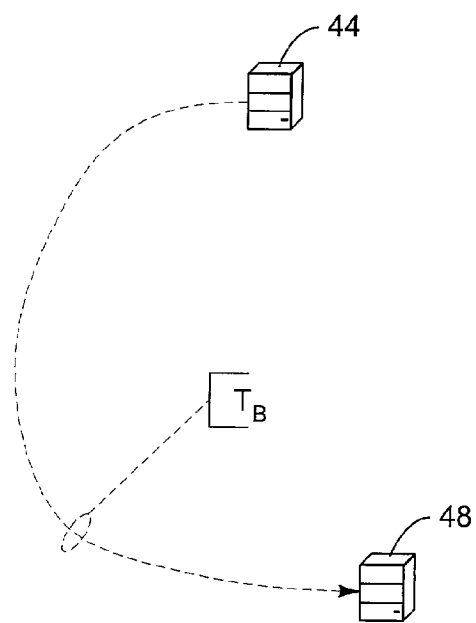

As shown in FIG. 8, the merchant site 44 verifies the authorization of the credit/payment by passing the authorization ticket (TB) back to the financial institution 48, along with any other details of the transaction (e.g., merchant ID, user information, contract terms, etc.). The merchant site 44 may contact the financial institution 48 via the internet, or through secure, dedicated channels. The authorization ticket cannot be meaningfully decrypted or altered by the merchant. Accordingly, the financial institution can be assured that the ticket contains the original amount and merchant URL that was reported by the user terminal 42. Also, the user is protected since her account details are never exposed to the merchant.

Existence of the authorization ticket signals to the financial institution 48 that a "PortalCard" purchase option was used for the transaction. After decrypting the authorization ticket, these details can be used to verify the transaction details. The ticket timestamp can also be used to prevent duplicate transaction submissions. The financial institution 48 confirms validity of the authorization ticket to the merchant site 44. Optionally, the user then receives a confirmation from the Merchant site 44 that the transaction has been successfully completed.

The following discussion is presented to summarize some of the features and functionality of system 40. A user begins an online purchase by accessing a merchant website. A decoder, residing on the user's site, reads (or identifies) a watermarked document. The client residing on a user terminal contacts a central site to obtain a URL for a financial institution's authentication server and to get a session ticket. The client contacts the financial institution's server via the URL and passes the session ticket to the bank to obtain an authorization ticket. The client then passes the authorization ticket to the merchant. The merchant includes the authorization ticket in its financial transaction with the financial institution. Preferably, these steps are seamlessly carried out by the user's computer (e.g., the client software), in conjunction with the merchant website, central site, and financial institution site.

System 40 offers many advantages. For example, system 40 provides a secure transaction system for online purchases via layers of message encryption and obtaining secure communication channels. According to one embodiment, a merchant is prevented from accessing user credit information (e.g., account or document ID). System 40 also prevents an unscrupulous user from changing price or transaction details, since the authorization ticket is securely encrypted. The above-described hash matching techniques also provide a unique feature of the present invention. The hash matching helps to prevent capture and playback attacks. These and other advantages are apparent from the detailed description.

Alternative Embodiments

There are many variations and alternative arrangements of system 40. Of course, such modifications fall within the scope of the present invention. For example, additional security measures may be taken in event that a user accesses the transaction system (e.g., merchant site 44, central site 46 and financial institution 48, etc.) through remote site 50 (FIG. 4). For example, input device 51 and its link to a remote site 50 may include an encrypted link (or links), using a key negotiated by camera 51 and software resident on the remote site 50. Secure encryption techniques may also be used for a link between remote site 52 and the system.

In another alternative arrangement, a watermark is not decoded by the user terminal 42 (e.g., a decoder operating on user terminal 42). Instead, the decoder determines whether a watermark is present within a captured image. If a watermark is present, a block of image data (e.g., all or some of the captured image) is passed as a request to central site 46. Preferably, the request includes the image data ($IB_{LOCK}$), a timestamp ($TIME_C$), and the user terminal's IP address ($C_{IP}$). The request may be encrypted with a central site public key ($_{DKU}$) for additional security. An encrypted request is represented in FIG. 5 as $[IBLOCK\|TIME_C\|C_{IP}]_{DKU}$. The central site 46 decrypts the request and then extracts the watermark from the image data. Additional data (e.g., the encrypted document ID and document type identifier) can then be extracted from the watermark. This alternative arrangement shifts a majority of the decoding from the user terminal 42 to the central site 46. Shifting the decoding away from the user terminal 42 may provide an advantage, particularly if a third party could intercept the data stream from the user terminal 42 to the central site 46. In this alternative arrangement, the intercepted stream will not be in a decoded form—which significantly reduces the amount of revealed data. Also, since the decoding processes (or a majority of the processes) are maintained securely by central site 46, there is less of the decoding algorithms (and/or software code) to attack at the user terminal 42.

Upon receiving the image block, the central site 46 may optionally record the image data or a hash of the image data. The hash is then used to match against other hashes corresponding to the user terminal 42, as discussed above.

A premise of these ideas also finds application beyond online purchases. One application is to verify permissions, add security to logins, and/or to facilitate account access (e.g., a bank account, credit account, access to restricted or hidden network layers, etc.). For example, a user establishes a link with the central site 46 via an embedded object to obtain a corresponding permission authenticator URL. The central site 46 generates a session ticket with appropriate data (identifiers, IP addresses, etc.). The user terminal 42 passes the session ticket to the authenticator (e.g., bank, corporation, etc.) for authorization. The authenticator authorizes access by providing an authorization ticket or other enabling data (corresponding password, new URL, etc.). Such modifications are within the scope of the present invention.

Additional Security Features

To deter use of precision photocopy apparatuses to reproduce document faces (while retaining the associated watermark), the face of the document can be provided with a reflective layer, e.g., in the form of an overlay or varnish. In the bright illumination of a photocopier, such layer mirrors the light back onto the photodetectors, preventing them from accurately reproducing the watermark pattern. In contrast, when presented to a web cam or other such imaging device, no bright illumination is typically present, so the photosensors are not overwhelmed and the document can be used for its intended authentication purpose.

Concluding Remarks

The foregoing are just exemplary implementations of secure online transaction systems. It will be recognized that there are a great number of variations on these basic themes. The foregoing illustrates but a few applications of the detailed technology. There are many others.

Consider, for example, the use of embedded watermark data in a document to allow access to a resource. A card may be used to grant physical access through a normally locked door. Or a card may be used to logon to a computer network—with directory privileges tied to the data decoded from the card.

Entry of a user's PIN code, or other identity check, may be desirable in certain contexts, e.g., to guard against granting access to a person who has found or stolen someone else's card. Security is further enhanced when a user possesses both i) a physical document, and ii) corresponding verification data (e.g., password, PIN, retinal scan, voice recognition, biometric verification data, etc). To illustrate, in order to gain system or network access (or to login), a user must demonstrate physical possession of document. A compliant reader reads and extracts embedded data from the document. The embedded data is used to index or otherwise identify corresponding verification data. The corresponding verification data is preferably predetermined and stored for comparison. The user is prompted to provide the verification data (e.g., to provide a PIN, yield to a fingerprint or retinal scan, etc.). (The user may be prompted to provide such verification data prior to, or after, presentment of the document). System access is granted only when the provided verification data correctly corresponds with the predetermined verification data. This multi-step security (e.g., physical possession and verification data) is valuable in many environments, including authentication to a network, access to a software application, verification of identity, verification of permissions, login security, restricted access management, etc. The basic system functionality as shown in FIG. 2 may be used to facilitate such. Of course, a link between a client and host also may be used to facilitate such a verification process.

In some cases, the data encoded in the card fully replicates certain information associated with the card (e.g., the bearer's last name or initials, or OCR printing, or mag-stripe data, etc.). Or the encoded data can be related to other information on the card in a known way (e.g., by a hash function based on the bearer's printed name, or the full-text card contents). Or the encoded data can be unrelated to other information on the card. In many embodiments, the data encoded in the card may serve as an index to a larger repository of associated data stored in a remote database, e.g., on computer 30. Thus, for example, an index datum read from a passport may allow a passport inspector to access a database record corresponding to the encoded data. This record may include a reference photograph of the passport holder, and other personal and issuance data. If the data obtained from the database does not match the text or photograph included on the card, then the card has apparently been altered.

Whereas specific bit lengths and string names have been used for illustrative purposes, it will be appreciated that the present invention is not so limited. Instead, data of differing lengths and names may be used. Also, whereas specific components for the various tickets have been used for illustrative purposes, it will be appreciated by those skilled in the art that a ticket could include alternative components, so long as some form of identifying features remain.

To provide a comprehensive disclosure without unduly lengthening this specification, the above-detailed patent documents are incorporated herein by reference.

Having described and illustrated the principles of the invention with reference to illustrative embodiments, it should be recognized that the invention is not so limited.

As a further alternative, the embedded data may be infrared (IF) or ultraviolet (UV) sensitive. The embedding can be effected using IF or UV ink. For example, the CCD or CMOS detector of most cameras (under normal lighting) detects some of the UV spectrum. The effect can be enhanced by illuminating the object with black light in order to fluoresce the mark at the time of imaging—making the mark visible to the camera. Earlier disclosure relating to use of UV inks is provided in co-pending U.S. patent application Ser. No. 09/562,516, filed May 1, 2000, and 60/257,822, filed Dec. 21, 2000, each of which are hereby incorporated by reference.

The particular combinations of elements and features in the above-detailed embodiments are exemplary only; the interchanging and substitution of these teachings with other teachings in this and the incorporated-by-reference patent/applications are also contemplated.

The above-described methods and functionality can be facilitated with computer executable software stored on computer readable mediums, such as electronic memory circuits, RAM, ROM, magnetic media, optical media, removable media, etc. Such software may be stored on a user terminal, and/or distributed throughout a network. Data structures representing the various data strings may also be stored on such computer readable mediums.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of verifying data comprising:
digitally capturing an image;
computing a first hash of the captured image;
comparing the first hash with a database of hashes, the database of hashes comprising hashes corresponding to previously captured images; and
identifying an attack when the first hash matches at least one hash in the database.

2. The method of claim 1, further comprising:
enabling further processing when the first hash fails to match any of the hashes in the database.

3. A method of verifying data comprising:
digitally capturing an image;
computing a first hash of the captured image; comparing the first hash with a database of hashes, the database of hashes comprising hashes corresponding to previously captured images, wherein the captured image comprises an embedded watermark;
extracting data from the watermark;
encrypting a request, the request comprising the extracted data and the first hash; and
sending the encrypted request to an external computer, wherein said comparing is performed at said external computer.

4. A method of verifying data comprising:
digitally capturing an image;
computing a first hash of the captured image;
comparing the first hash with a database of hashes, the database of hashes comprising hashes corresponding to previously captured images, wherein the captured image comprises an embedded plural-bit watermark;
extracting plural-bit date from the watermark;
encrypting a request comprising a block of image data from the image;
sending the encrypted request to an external computer; wherein said computing and said comparing are performed at the external computer.

5. A system for exchanging data comprising:
a user terminal comprising a watermark reader, and a capturing device to capture an image of a watermarked document; and
a central site comprising a database of image hashes, wherein said user terminal communicates with said central site, and wherein said reader reads a watermark and computes a hash of a captured image and passes the hash to said central site for comparison with said database of image hashes.

6. A method of preventing online attacks, comprising:
capturing an encoded image;
extracting data from the encoded image;
computing a hash of the captured image;
comparing the hash against previously determined hashes; and
linking the extracted data to other data when the hash does not match any of the previously determined hashes.

7. A method of preventing online attacks, comprising:
capturing an encoded image;
extracting data from the encoded image;
computing a hash of the captured image;
comparing the hash against previously determined hashes; and
disregarding the extracted data when the hash matches at least one of the previously determined hashes.

8. A method comprising:
maintaining a database including a plurality of hashes stored therein;
receiving through a network a first hash derived from image data, the first hash being derived remotely relative to performance of said method;
determining whether the first hash has been previously received with reference to at least the plurality of hashes stored in the database;
disregarding a request associated with the first hash if the first hash has been previously received.

9. A method comprising:

maintaining a database including a plurality of hashes stored therein;

receiving through a network a request and a first hash derived from image data, the first hash being derived remotely relative to performance of said method;

determining whether the first hash has been previously received with reference to at least the plurality of hashes stored in the database;

as a condition of executing the request, requesting validation information from a user associated with the request when the first hash has been previously received; and executing the request when at least one of the following is met: i) the first hash has not been previously received; and ii) proper validation information is received from a user.

* * * * *